US007297664B2

(12) United States Patent
Santra et al.

(10) Patent No.: US 7,297,664 B2
(45) Date of Patent: Nov. 20, 2007

(54) CEMENT-FREE ZEOLITE AND FLY ASH SETTABLE FLUIDS AND METHODS THEREFOR

(75) Inventors: Ashok K. Santra, Duncan, OK (US); Karen Luke, Duncan, OK (US); B. Raghava Reddy, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 464 days.

(21) Appl. No.: 10/901,507

(22) Filed: Jul. 28, 2004

(65) Prior Publication Data

US 2006/0025312 A1 Feb. 2, 2006

(51) Int. Cl.
*C09K 8/74* (2006.01)
*E21B 43/00* (2006.01)

(52) U.S. Cl. .................. 507/269; 507/207; 507/274; 507/276; 166/285; 166/293

(58) Field of Classification Search ............. 507/269, 507/276; 106/705
See application file for complete search history.

(56) References Cited

U.S. PATENT DOCUMENTS

| | | | |
|---|---|---|---|
| 1,943,584 A | 1/1934 | Cross ..................... 141/252 |
| 2,094,316 A | 9/1937 | Cross et al. |
| 2,131,338 A | 9/1938 | Vail |
| 2,349,049 A | 5/1944 | Means ..................... 252/8.5 |
| 2,727,001 A | 12/1955 | Rowe |
| 2,848,051 A | 8/1958 | Williams |
| 3,047,493 A | 7/1962 | Rosenberg |
| 3,065,170 A | 11/1962 | Dumbauld et al. |
| 3,179,528 A | 4/1965 | Holmgreen et al. |
| 3,293,040 A | 12/1966 | Shaler, Jr. et al. |
| 3,359,225 A | 12/1967 | Weisend ..................... 260/29.6 |
| 3,694,152 A | 9/1972 | Sersale et al. ............. 423/329 |
| 3,781,225 A | 12/1973 | Schwartz |
| 3,884,302 A | 5/1975 | Messenger |
| 3,887,385 A | 6/1975 | Quist et al. .................. 106/96 |
| 3,888,998 A | 6/1975 | Sampson et al. |
| 3,963,508 A | 6/1976 | Masaryk |
| 4,054,462 A | 10/1977 | Stude |
| 4,141,843 A | 2/1979 | Watson ................. 252/8.55 R |
| 4,217,229 A | 8/1980 | Watson ................. 252/8.55 R |
| 4,311,607 A | 1/1982 | Kaeser |
| 4,363,736 A | 12/1982 | Block |

(Continued)

FOREIGN PATENT DOCUMENTS

CA 2153372 7/1995

(Continued)

OTHER PUBLICATIONS

Luke, Karen et al., "Zeolite-Containing Drilling Fluids," filed Oct. 9, 2006 as U.S. Appl. No. 11/544,691.

(Continued)

*Primary Examiner*—Randy Gulakowski
*Assistant Examiner*—John J. Figueroa
(74) *Attorney, Agent, or Firm*—Craig W. Roddy; Haynes and Boone

(57) ABSTRACT

Zeolite and Class F fly ash compositions are provided for use as cement-free settable fluids such as settable spotting fluids and cementitious compositions.

57 Claims, 4 Drawing Sheets

U.S. PATENT DOCUMENTS

| | | | |
|---|---|---|---|
| 4,368,134 A | 1/1983 | Kaeser | |
| 4,372,876 A | 2/1983 | Kulprathipanja et al. | |
| 4,435,216 A | 3/1984 | Diehl et al. | 106/97 |
| 4,444,668 A | 4/1984 | Walker et al. | 252/8.55 R |
| 4,468,334 A | 8/1984 | Cox et al. | |
| 4,474,667 A | 10/1984 | Block | |
| 4,482,379 A | 11/1984 | Dibrell et al. | 106/76 |
| 4,515,216 A | 5/1985 | Childs et al. | |
| 4,515,635 A | 5/1985 | Rao et al. | 106/90 |
| 4,530,402 A | 7/1985 | Smith et al. | 166/291 |
| 4,536,297 A | 8/1985 | Loftin et al. | 252/8.5 C |
| 4,548,734 A * | 10/1985 | Chaux et al. | 516/53 |
| 4,552,591 A | 11/1985 | Millar | |
| 4,555,269 A | 11/1985 | Rao et al. | 106/90 |
| 4,557,763 A | 12/1985 | George et al. | 106/90 |
| 4,632,186 A | 12/1986 | Boncan et al. | |
| 4,650,593 A | 3/1987 | Slngerland | |
| 4,676,317 A | 6/1987 | Fry et al. | 166/293 |
| 4,703,801 A | 11/1987 | Fry et al. | 166/293 |
| 4,717,488 A | 1/1988 | Seheult et al. | 252/8.551 |
| 4,772,307 A | 9/1988 | Kiss et al. | |
| 4,784,693 A | 11/1988 | Kirkland et al. | |
| 4,818,288 A | 4/1989 | Aignesberger et al. | 106/90 |
| 4,888,120 A | 12/1989 | Mueller et al. | 252/8.551 |
| 4,986,989 A | 1/1991 | Sirosita et al. | |
| 5,121,795 A | 6/1992 | Ewert et al. | 166/292 |
| 5,123,487 A | 6/1992 | Harris et al. | 166/277 |
| 5,125,455 A | 6/1992 | Harris et al. | 166/292 |
| 5,127,473 A | 7/1992 | Harris et al. | 166/277 |
| 5,151,131 A | 9/1992 | Burkhalter et al. | 106/822 |
| 5,238,064 A | 8/1993 | Dahl et al. | 166/293 |
| 5,252,554 A | 10/1993 | Mueller et al. | 507/138 |
| 5,301,752 A | 4/1994 | Cowan et al. | 166/292 |
| 5,307,876 A | 5/1994 | Cowan et al. | 166/293 |
| 5,314,022 A | 5/1994 | Cowan et al. | 166/293 |
| 5,340,860 A | 8/1994 | Brake et al. | 524/166 |
| 5,346,012 A | 9/1994 | Heathman et al. | 166/293 |
| 5,383,967 A | 1/1995 | Chase | 106/737 |
| 5,435,846 A | 7/1995 | Tatematsu et al. | 106/813 |
| 5,464,060 A | 11/1995 | Hale et al. | 166/293 |
| 5,494,513 A | 2/1996 | Fu et al. | 106/672 |
| 5,501,276 A | 3/1996 | Weaver et al. | 166/291 |
| 5,529,624 A | 6/1996 | Riegler | 106/675 |
| 5,588,489 A | 12/1996 | Chatterji et al. | |
| 5,680,900 A | 10/1997 | Nguyen et al. | 166/295 |
| 5,711,383 A * | 1/1998 | Terry et al. | 175/72 |
| 5,716,910 A | 2/1998 | Totten et al. | 507/102 |
| 5,759,964 A | 6/1998 | Shuchart et al. | 507/209 |
| 5,789,352 A | 8/1998 | Carpenter et al. | 507/209 |
| 5,807,810 A | 9/1998 | Blezard et al. | |
| 5,851,960 A | 12/1998 | Totten et al. | 507/118 |
| 5,866,517 A | 2/1999 | Carpenter et al. | 507/226 |
| 5,913,364 A | 6/1999 | Sweatman | 166/281 |
| 5,964,692 A | 10/1999 | Blezard et al. | 516/59 |
| 5,990,052 A | 11/1999 | Harris | 507/214 |
| 6,060,434 A | 5/2000 | Sweatman et al. | 507/216 |
| 6,063,738 A | 5/2000 | Chatterji et al. | 507/269 |
| 6,070,664 A | 6/2000 | Dalrymple et al. | 166/281 |
| 6,138,759 A | 10/2000 | Chatterji et al. | 166/293 |
| 6,145,591 A | 11/2000 | Boncan et al. | 166/291 |
| 6,149,724 A | 11/2000 | Ulibarri et al. | |
| 6,167,967 B1 | 1/2001 | Sweatman | 166/281 |
| 6,170,575 B1 | 1/2001 | Reddy et al. | 166/293 |
| 6,171,386 B1 | 1/2001 | Sabins | 106/724 |
| 6,176,315 B1 | 1/2001 | Reddy et al. | 166/295 |
| 6,182,758 B1 | 2/2001 | Vijn | |
| 6,209,646 B1 | 4/2001 | Reddy et al. | 166/300 |
| 6,210,476 B1 | 4/2001 | Chatterji et al. | 106/677 |
| 6,213,213 B1 | 4/2001 | van Batenburg | 166/300 |
| 6,230,804 B1 | 5/2001 | Mueller et al. | 166/293 |
| 6,234,251 B1 | 5/2001 | Chatterji et al. | 166/295 |
| 6,235,809 B1 | 5/2001 | Arias et al. | 523/130 |
| 6,245,142 B1 | 6/2001 | Reddy et al. | 106/724 |
| 6,258,757 B1 | 7/2001 | Sweatman et al. | 507/219 |
| 6,273,191 B1 | 8/2001 | Reddy et al. | 166/293 |
| 6,283,213 B1 | 9/2001 | Chan | 166/291 |
| 6,315,042 B1 | 11/2001 | Griffith et al. | 166/291 |
| 6,330,917 B2 | 12/2001 | Chatterji et al. | 166/295 |
| 6,336,505 B1 | 1/2002 | Reddy et al. | 166/293 |
| 6,364,016 B1 | 4/2002 | Dalrymple et al. | 166/270 |
| 6,372,694 B1 | 4/2002 | Osinga et al. | |
| 6,379,456 B1 | 4/2002 | Heathman et al. | 106/724 |
| 6,390,197 B1 | 5/2002 | Maroy | |
| 6,405,801 B1 | 6/2002 | Vijn et al. | 166/293 |
| 6,419,016 B1 | 7/2002 | Reddy | 166/293 |
| 6,422,314 B1 | 7/2002 | Todd et al. | 166/312 |
| 6,454,004 B2 | 9/2002 | Reddy et al. | 166/293 |
| 6,457,524 B1 | 10/2002 | Roddy | 166/293 |
| 6,475,275 B1 | 11/2002 | Nebesnak et al. | 106/803 |
| 6,476,169 B1 | 11/2002 | Eoff et al. | 526/307.2 |
| 6,478,868 B1 | 11/2002 | Reddy et al. | 106/696 |
| 6,478,869 B2 | 11/2002 | Reddy et al. | 106/724 |
| 6,488,091 B1 | 12/2002 | Weaver et al. | 166/300 |
| 6,494,951 B1 | 12/2002 | Reddy et al. | 106/705 |
| 6,497,283 B1 | 12/2002 | Eoff et al. | 166/293 |
| 6,508,305 B1 | 1/2003 | Brannon et al. | 166/293 |
| 6,508,306 B1 | 1/2003 | Reddy et al. | 166/295 |
| 6,524,384 B2 | 2/2003 | Griffith et al. | 106/705 |
| 6,554,068 B1 | 4/2003 | Chatterji et al. | 166/285 |
| 6,555,505 B1 | 4/2003 | King et al. | 507/202 |
| 6,565,647 B1 | 5/2003 | Day et al. | 106/813 |
| 6,566,310 B2 | 5/2003 | Chan | 507/211 |
| 6,593,402 B2 | 7/2003 | Chatterji et al. | 524/7 |
| 6,607,035 B1 | 8/2003 | Reddy et al. | 166/295 |
| 6,610,139 B2 | 8/2003 | Reddy et al. | 106/724 |
| 6,616,753 B2 | 9/2003 | Reddy et al. | 106/718 |
| 6,626,243 B1 | 9/2003 | Boncan | 166/293 |
| 6,630,021 B2 | 10/2003 | Reddy et al. | 106/809 |
| 6,660,080 B2 | 12/2003 | Reddy et al. | 106/724 |
| 6,702,044 B2 | 3/2004 | Reddy et al. | 175/64 |
| 6,722,434 B2 | 4/2004 | Reddy et al. | |
| 6,737,385 B2 | 5/2004 | Todd et al. | 507/140 |
| 6,743,288 B2 | 6/2004 | Eoff et al. | 106/724 |
| 6,767,868 B2 | 7/2004 | Dawson et al. | |
| 6,786,966 B1 * | 9/2004 | Johnson et al. | 106/705 |
| 6,832,652 B1 | 12/2004 | Dillenbeck et al. | |
| 6,840,319 B1 | 1/2005 | Cromwell et al. | |
| 6,889,767 B2 | 5/2005 | Reddy et al. | |
| 7,219,733 B2 * | 5/2007 | Luke et al. | 166/293 |
| 2001/0014651 A1 | 8/2001 | Reddy et al. | 502/408 |
| 2002/0077390 A1 | 6/2002 | Gonnon et al. | 524/2 |
| 2002/0091177 A1 | 7/2002 | Gonnon et al. | 524/5 |
| 2002/0117090 A1 | 8/2002 | Ku | 106/737 |
| 2002/0157575 A1 | 10/2002 | DiLullo et al. | 106/711 |
| 2003/0066460 A1 | 4/2003 | Reddy et al. | 106/692 |
| 2003/0092582 A1 | 5/2003 | Reddy et al. | 507/100 |
| 2003/0096945 A1 | 5/2003 | Eoff et al. | 528/373 |
| 2003/0153466 A1 | 8/2003 | Allen et al. | 504/358 |
| 2003/0181543 A1 | 9/2003 | Reddy et al. | 523/130 |
| 2003/0203996 A1 | 10/2003 | Gonnon et al. | 524/5 |
| 2003/0217847 A1 | 11/2003 | Reddy et al. | 166/293 |
| 2004/0007162 A1 | 1/2004 | Morioka et al. | 106/714 |
| 2004/0040475 A1 | 3/2004 | Roij | 106/819 |
| 2004/0040712 A1 | 3/2004 | Ravi et al. | 166/293 |
| 2004/0069537 A1 | 4/2004 | Reddy et al. | 175/72 |
| 2004/0069538 A1 | 4/2004 | Reddy et al. | 175/72 |
| 2004/0107877 A1 | 6/2004 | Getzlaf et al. | 106/813 |
| 2004/0108113 A1 | 6/2004 | Luke et al. | 166/292 |
| 2004/0112600 A1 | 6/2004 | Luke et al. | 166/295 |
| 2004/0187740 A1 * | 9/2004 | Timmons | 106/705 |
| 2004/0188091 A1 | 9/2004 | Luke et al. | 166/291 |
| 2004/0188092 A1 | 9/2004 | Santra et al. | 166/291 |
| 2004/0244977 A1 | 12/2004 | Luke et al. | 166/292 |
| 2004/0262000 A1 | 12/2004 | Morgan et al. | |

| | | | |
|---|---|---|---|
| 2004/0262001 | A1 | 12/2004 | Caveny et al. |
| 2005/0000734 | A1 | 1/2005 | Getzlaf et al. ............... 175/73 |
| 2005/0034864 | A1 | 2/2005 | Caveny et al. |
| 2005/0133222 | A1 | 6/2005 | Arias et al. |
| 2006/0025312 | A1 | 2/2006 | Santra et al. |

FOREIGN PATENT DOCUMENTS

| | | |
|---|---|---|
| EP | 0 802 253 S1 | 10/1997 |
| EP | 0 895 971 A1 | 2/1999 |
| EP | 0 1260 491 A1 | 11/2002 |
| EP | 0 428 805 A1 | 6/2004 |
| EP | 1 428 805 A1 | 6/2004 |
| GB | 1469954 | 4/1977 |
| GB | 2 353 523 A | 2/2001 |
| JP | 52117316 A | 1/1977 |
| JP | 61021947 A | 1/1986 |
| JP | 07 003254 | 1/1995 |
| JP | 101101487 | 4/1998 |
| RU | 1373781 | 2/1988 |
| WO | WO 98/54108 | 12/1998 |
| WO | WO 01/70646 A1 | 9/2001 |
| WO | WO 2005/059301 A1 | 6/2005 |

OTHER PUBLICATIONS

Luke, Karen et al., "Fluid Loss Additives For Cement Slurries," filed Oct. 10, 2006 as U.S. Appl. No. 11/545,392.

Foreign communication from a related counterpart application dated Sep. 30, 2005.

SPE 20624 entitled "Acidization of Analcime-Cementing Sandstone, Gulf of Mexico", by D.R. Underdown et al., dated 1990.

SPE 39595 entitled "Designing a Remedical Acid Treatment for Gulf of Mexico Deepwater Turbitie Sands Containing Zeolite Cement", by B.A. Rogers et al., dated 1998.

Paper entitled "Tectonics, fluid migration, and fluid pressure in a Deformed forarc basin, Cook Inlet, Alaska", by R.L. Bruhn et al., pp. 550-563, dated 2000.

Paper entitled "Hydraulic Conductivity Measurement On Discrete Samples Collected From Leg 141, Site 863", by Kevin Brown, pp. 401-405, dated 1995.

Paper entitled "Alteration of Clay Minerals And Zeolites In Hydrothermal Brines", by Sridhar Kamarneni et al., pp. 383-391, dated 1983.

Paper entitled "A Non-Conventional Way of Developing Cement Slurry For Geothermal Wells", by V. Barlet-Gouedard et al., pp. 85-91, dated 2001.

Paper entitled "Portland-Zeolite-Cement For Minimizing Alkali-Aggregate Expansion", by R. Searsale, pp. 404-410, dated 1987.

Paper entitled "Zeolite Crystallization In Portland Cement Concrete Due To Alkali-Aggregate Reaction", by S.A. Marfil et al., paged 1283-1288, dated 1993.

Paper entitled "A study on the hydration rate of natural zeolite blended Cement pastes", by C.S. Poon et al., pp. 427-432, dated 1999.

Paper entitled "Zeolite ceramsite cellular concrete", by N-Q. Feng pp. 117-122, dated 2000.

Paper entitled "Immobilization of caesium-loaded ion exchange resins in Zeolite-cement blends", by Sandor Bagosi et al., pp. 479-485, dated 1999.

Paper entitled "Effect of Bentonite and Zeolite on Durability of Cement Suspension under Sulfate Attack", by Ivan Janotka, pp. 710-715, dated 1988.

Paper entitled "Reuse of waste catalysts from petrochemical industries For cement substitution", by Nan Su et al., pp. 1773-1783, dated 2000.

Paper entitled "Extreme vertices design of concrete with combined Mineral admixtures", by Jian-Tong Ding et al., pp. 957-960, dated 1999.

Paper entitled "The Properties of Mortar Using Blends With Portland Cement Clinker, Zeolite Tuff and Gypsum", by Ivan Janotka, et al., pp. 105-110, dated 1995.

Paper entitled "Study on the suppression effect of natural zeolite on Expansion of concrete due to alkali-aggregate reaction", by Feng Naiqian et al., pp. 17-24, dated 1998.

Paper entitled "Comparative study of the initial surface absorption and Chloride diffusion of high performance zeolite, silica fume and PFA Concrete", by Sammy Y.N. Chan et al., pp. 293-300, dated 1999.

Paper entitled "A study on the hydration rate of natural zeolite Blended cement pastes", by C.S. Poon et al., pp. 427-432, dated 1999.

Baroid Brochure entitled "Aquagel Gold Seal®" dated 2002.

Halliburton brochure entitled "CFR-2 Cement Friction Reducer" dated 1999.

Halliburton brochure entitled "CFR-3 Cement Friction Reducer" dated 1998.

Halliburton brochure entitled "D-Air 2 Anti-Foam Agent" dated 1999.

Halliburton brochure entitled Halad®-344 Fluid-Loss Additive dated 1998.

Halliburton brochure entitled "Halad®-413 Fluid-Loss Additive" dated 1999.

Halliburton brochure entitled "HR®-5 Cement Additive" dated 1998.

Halliburton brochure entitled "HR®-7 Cement Retarder" dated 1999.

Halliburton brochure entitled "MICROSAND Cement Additive" dated 1999.

Halliburton brochure entitled SSA-1 Strength-Stabilizing Agent dated 1998.

Halliburton brochure entitled "SSA-2 Coarse Silica Flour" dated 1999.

Halliburton brochure entitled "Baroid Barazan® Plus" dated 2002.

Halliburton brochure entitled "Baroid EZ-MUD® Shale Stabilizer" dated 2002.

Halliburton brochure entitled "Baroid INVERMUL® Emulsifier" dated 2002.

Halliburton brochure entitled "Baroid EZ MUL® Emulsifier" dated 2002.

Halliburton brochure entitled "Baroid EZ MUL® NTE Emulsifier" dated 2002.

Halliburton brochure entitled "Baroid GELTONE® II Viscosifer" dated 2002.

Halliburton brochure entitled "Baroid GELTONE® V Viscosifier" dated 2002.

Halliburton brochure entitled "Baroid DURATONE® HT Filtration Control Agent" dated 2002.

Paper entitled "Zeolite P In Cements : Its Potential For Immobilizing Toxic And Radioactive Waste Species," by M. Atkins, et al., dated 1994.

Powder Diffraction File, PFD, Alphabetical Indexes for Experimental Patterns, Inorganic Phases, Sets 1-52, dated 2002.

Foreign communication from a related counterpart application dated Mar. 25, 2004.

Office action from a related counterpart application dated Dec. 4, 2003.

U.S. Appl. No. 10/738,199 entitled "Zeolite-Containing Settable Spotting Fluids" by Karen Luke et al., filed Dec. 17, 2003.

U.S. Appl. No. 10/795,158 entitled "Zeolite-Containing Drilling Fluids" by Donald A. Getzlaf et al., filed Mar. 5, 2004.

\* cited by examiner

CEMENT-FREE ZEOLITE AND FLY ASH SETTABLE FLUIDS AND METHODS THEREFOR

BACKGROUND

The present application relates generally to cement-free zeolite and Class F fly ash settable fluids and methods for using such settable fluids as cementitious materials for sealing a subterranean zone penetrated by a wellbore or for using such fluids as settable spotting fluids.

In the drilling of an oil or gas well, a wellbore is drilled using a drilling fluid that is continuously circulated down a drill pipe, through a drill bit, and upwardly through the wellbore to the surface. When the desired drilling depth of the well is reached, a pipe string, e.g., a casing, is run into the wellbore. After clean-up operations are performed in the wellbore, a cement composition is pumped into the annular space between the walls of the wellbore and the casing. In this method, known as "primary cementing", the cement composition sets in the annular space, supporting and positioning the casing, and forming a substantially impermeable barrier, or cement sheath, that isolates the wellbore from subterranean zones. Performance of the cement composition is important to achieving and maintaining zonal isolation.

During operations performed in a wellbore, a number of problems can occur such as difficulty in removing portions of the drilling fluid, or an inability to achieve a satisfactory bond between the pipe and the walls of the wellbore due to drilling fluid that remains in the wellbore during primary cementing operations. Incomplete removal of drilling fluid may interfere with proper setting of cement resulting in poor bonding between the cement and the subterranean formation. Even though spacer fluids are commonly used for displacing the drilling fluid from the wellbore prior to cementing, frequently such displacement efforts still leave pockets of drilling fluid in the wellbore.

Settable spotting fluids (SSF's) were developed to help reduce risks associated with incomplete drilling fluid displacement, and to improve zonal isolation. SSF's have rheological properties that can effect optimum mud displacement and are compatible with cement slurries. SSF's contain a hydraulic material that can allow them to set with time. If an SSF is bypassed during displacement, the fluid and filter cake from the drilling fluid will set up providing compressive strength. However, drilling fluids and spacer fluids lack cementitious properties. Therefore, using an SSF can be superior to circulating a drilling fluid into the well before cementing. Bypassing the drilling fluid with the cement slurry results in partial zonal isolation.

Conventional settable spotting fluids include a material that sets over time, such as blast furnace slag, fly ash, and similar hydraulic components. Water-based settable spotting fluids have been designed with either fly ash (U.S. Pat. No. 6,138,759 to Chatterji et al., filed Dec. 16, 1999) or zeolite (U.S. patent application Ser. No. 10/738,199, filed Dec. 17, 2003) in which lime-hydrate was used for activation.

Fly Ash: Pozmix®A+lime at 15%, no Na$_2$SO$_4$, no zeolite;
Fly Ash+Na$_2$SO$_4$: Pozmix®A+lime at 15%, 2% Na$_2$SO$_4$, no zeolite (Slurry 4 of Table 4);
Fly Ash+Zeo+2% Na$_2$SO$_4$: Pozmix®A+lime at 15%, 2% Na$_2$SO$_4$, 15% zeolite (Slurry 3 of Table 4);
Fly Ash+Zeo+3% Na$_2$SO$_4$: Pozmix®A+lime at 15%, 3% Na$_2$SO$_4$, 15% zeolite.

Figure 4:
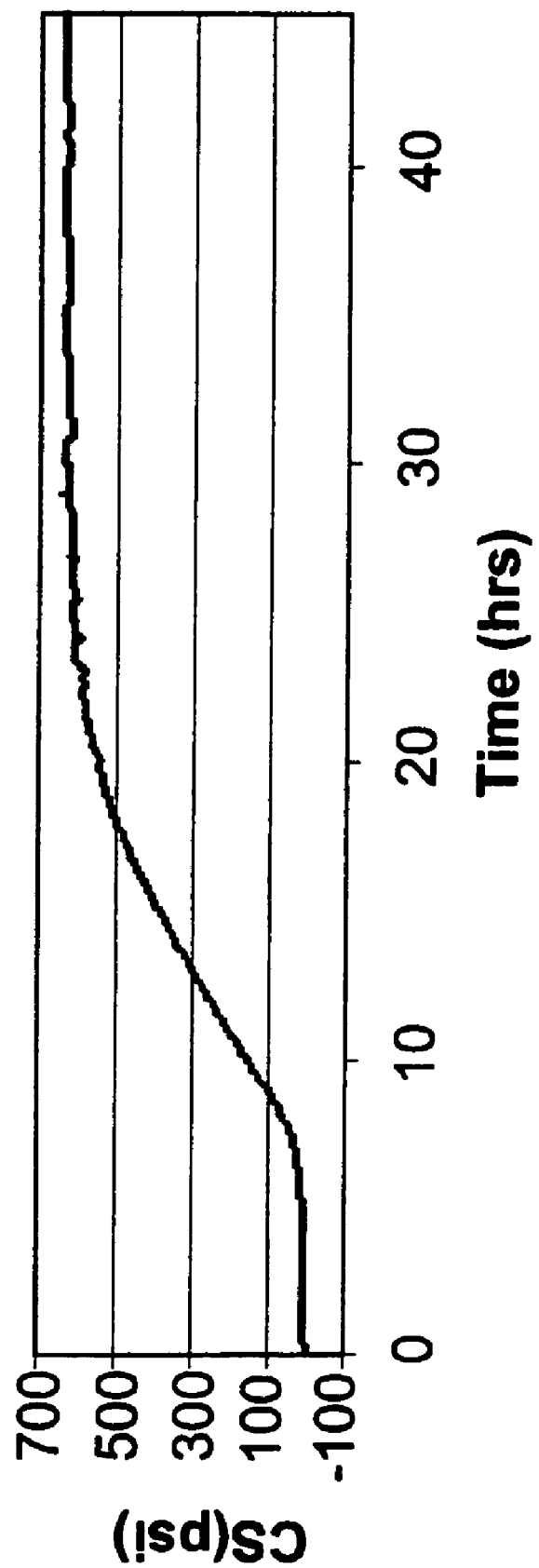

FIG. 4 shows UCA compressive strength development at 100° F. (37.8° C.) for Slurry 3 of Table 4 versus time in hours.

DESCRIPTION

Zeolite and Class F fly ash settable fluids are provided herein for use as a cement-free settable spotting fluid and as a cement-free cementitious settable fluid composition in cementing operations. The term "cementitious," as used herein, means having the properties of cement. The settable spotting fluids have a set delay time that can be adjusted by the ratio of components. The cementitious materials are suitable for a broad range of cementing applications, in particular, at low temperature, and provide for pumpable slurries that have a broad density range.

According to embodiments described herein, a blended cement-free zeolite and Class F fly ash settable spotting fluid composition is provided. The fluid comprises a zeolite, Class F fly ash, a source of calcium ion, and a carrier fluid. In embodiments of the invention, the settable spotting fluid further comprises a retarder, and in further embodiments of the invention, the settable spotting fluid comprises an activator. When the settable spotting fluid sets, the set fluid has a compressive strength comparable to that of a settable spotting fluid in which zeolite is the only settable material. For example, as shown in Example 1 below, a settable spotting fluid having an equal weight ratio of zeolite and fly ash developed a compressive strength of 400 psi (2.75 MPa) in 7 days at 160° F. (71° C.) while a control composition of fly ash did not set during that period of time. By comparison, a settable spotting fluid where zeolite is the only settable material set in 5 hours with a compressive strength of 500 psi (3.45MPa).

The settable spotting fluid is used in oil field operations as described herein and assists in addressing difficulty in removing portions of drilling fluid, mud, spacer fluid, or filter cake from a wellbore. The settable spotting fluid remains fluid with low gel strength for extended periods, having a setting time of 2 to 50 times longer than a settable spotting fluid in which zeolite is the only settable material. Because the slurry remains fluid, the settable spotting fluid contributes to wellbore hydrostatic pressure transmission and helps to maintain control while casing is run in the well. The settable spotting fluid of the present invention can provide isolation in wellbore channels created by poor displacement efficiency during a primary cementing method due to its compatibility with cement.

According to further embodiments described herein, a blended cement-free cementitious zeolite and Class F fly ash settable fluid is provided. The composition comprises a base mix of zeolite and Class F fly ash, a source of calcium ion, an accelerator, and a carrier fluid. In embodiments of the invention, the settable fluid comprises an activator.

The amounts of the components of the cementitious zeolite and Class F fly ash settable fluids are adjusted to achieve a target setting time. In certain embodiments where a wellbore is being cemented, a target setting time may begin in 2 to 6 hours after placement in the wellbore with the setting reaching a compressive strength plateau within a further time period of about one day as described in Example 2 below. Cement-free cementitious settable fluids are suitable for use in a broad temperature range including low temperature cementing applications. Such settable fluids are also useful for preparation of pumpable slurries having a density range that is broader than a density range that is possible with just zeolite and lime compositions. In particular, a settable fluid having 85% fly-ash in a base mix provided a compressive strength of 495 psi (3.42 MPa) at a temperature of 80° F. (26.7° C.). This particular slurry demonstrated a pumpable rheology with a density of 13.8 ppg (1656 Kg/m³).

The cementitious settable fluids of embodiments of the present invention are useful as a replacement for hydraulic cement, in particular, where cement is to be set in a water environment.

Zeolites: Zeolites are porous alumino-silicate minerals that may be either a natural or manmade material. Manmade zeolites are based on the same type of structural cell as natural zeolites, and are composed of aluminosilicate hydrates having the same basic formula as given below. It is understood that as used in this application, the term "zeolite" means and encompasses all natural and manmade forms of zeolites. All zeolites are composed of a three-dimensional framework of $SiO_4$ and $AlO_4$ in a tetrahedron, which creates a very high surface area. Cations and water molecules are entrained into the framework. Thus, all zeolites may be represented by the crystallographic unit cell formula:

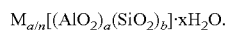
$M_{a/n}[(AlO_2)_a(SiO_2)_b]\cdot xH_2O$.

M represents one or more cations such as Na, K, Mg, Ca, Sr, Li or Ba for natural zeolites and $NH_4$, $CH_3NH_3$, $(CH_3)_3NH$, $(CH_3)_4N$, Ga, Ge and P for manmade zeolites; n represents the cation valence; the ratio of b:a is in a range from greater than or equal to 1 and less than or equal to 5; and x represents the moles of water entrained into the zeolite framework.

Preferred zeolites for use in the settable fluids of the present embodiments include analcime (hydrated sodium aluminum silicate), bikitaite (lithium aluminum silicate), brewsterite (hydrated strontium barium calcium aluminum silicate), chabazite (hydrated calcium aluminum silicate), clinoptilolite (hydrated sodium aluminum silicate), faujasite (hydrated sodium potassium calcium magnesium aluminum silicate), harmotome (hydrated barium aluminum silicate), heulandite (hydrated sodium calcium aluminum silicate), laumontite (hydrated calcium aluminum silicate), mesolite (hydrated sodium calcium aluminum silicate), natrolite (hydrated sodium aluminum silicate), paulingite (hydrated potassium sodium calcium barium aluminum silicate), phillipsite (hydrated potassium sodium calcium aluminum silicate), scolecite (hydrated calcium aluminum silicate), stellerite (hydrated calcium aluminum silicate), stilbite (hydrated sodium calcium aluminum silicate) and thomsonite (hydrated sodium calcium aluminum silicate). Most preferably, the zeolites for use herein include chabazite and clinoptilolite.

For the settable spotting fluids of the present embodiments, weight ratios of components are based on the amount of zeolite present. For the cementitious settable fluids of the present embodiments, zeolite is present in an amount by weight of a base mix of zeolite and class F fly ash and is present in an amount of from greater than zero to less than 100% by weight of the base mix. In additional embodiments of the cementitious composition, zeolite is present in an amount ranging between any of and including any of 10%, 15%, 20%, 25%, 30%, 40%, 50%, 60%, 70%, 80%, or 90% by weight of base mix.

Particle sizes of zeolites are measured on a Malvern Particle Size Analyzer, available from Malvern Instruments Ltd., of Worcestershire, UK, for example. For a given particle size, the Particle Size Analyzer identifies the volume percentage of particles in the sample that are beneath that particle size. The Particle Size Analyzer also provides a median particle size. Another parameter reported by the Particle Size Analyzer is the "span," that describes the width of the distribution independent of the median particle size. For example, two zeolites, clinoptilolite and chabazite, have very similar median particle size. However, clinoptilolite has a much higher span, meaning that clinoptilolite has more particles with larger size as compared to chabazite. A smaller sized particle provides a packed or reactive surface area that is greater than the packed or reactive surface area of larger sized particles. For a given zeolite-activator composition with the same median particle size, compressive strength is inversely proportional to the span of the particle size distribution. With a comparable or narrower span of particle size distribution, better compressive strengths are obtained with a smaller mean particle size. According to certain embodiments described herein, the mean particle size for a zeolite is less than or equal to 100 microns. In further embodiments, the mean particle size for a zeolite is less than or equal to 90 microns, 80 microns, 70 microns, 60 microns, 50 microns, 40 microns, 30 microns, 20 microns, or 10 microns. In a further embodiment, the mean particle size for a zeolite is greater than 1.0 micron and less than or equal to 10 microns.

Fly Ash: The presence of Class F fly ash in embodiments of the present invention provides settable fluids that are less expensive than settable fluids in which zeolite is the only settable material. Fly ash is produced by the combustion of powdered coal with a forced draft. The fly ash which is carried by the flue gases is recovered, for example, by electrostatic precipitators. Class F fly ash is commercially available from Halliburton Energy Services as Pozmix® A. For the settable spotting fluid of the present embodiments, Class F fly ash is present in an amount of from greater than zero to about 600% by weight of zeolite and, in additional embodiments, is present in an amount ranging between any of and including any of 50%, 100%, 200%, 300%, 400% or 500% by weight of zeolite. For the cementitious settable fluids of the present embodiments, Class F fly ash is present in an amount greater than zero and less than 100% by weight of a base mix of zeolite and Class F fly ash and, in additional embodiments, is present in an amount ranging between any of and including any of 10%, 20%, 30%, 40%, 50%, 60%, 70%, 75%, 80%, 85%, 90% or 95% by weight of base mix.

Source of Calcium Ion: A source of calcium ion is required for Class F fly ash to form a cementitious composition with water. Calcium ion is present in the settable fluids of the present invention in an amount of from about 5% to about 50% by weight of Class F fly ash and, in certain embodiments, calcium is present in the settable fluids of the present invention in an amount ranging between any of and including any of 10%, 15%, 20%, 25%, 30%, 35%, 40% or 45% by weight of Class F fly ash. A source of calcium may be the activator, or a calcium salt such as a salt having an anion containing a Group 4a, Group 5a, Group 6a, or Group 7a element, or a combination thereof, of the periodic table. That is, carbonates, carboxylates, silicates, nitrates, nitrites, phosphates, sulfates, sulfites, and halide salts of calcium in addition to oxides and hydroxides of calcium provide a source of calcium, for example.

Activator: The activator catalyzes the pozzolan "cementing" reaction. The activator is present in the settable fluids in an amount of from about 5% to about 50% by weight of zeolite for the settable spotting fluid and in an amount of from about 5% to about 50% by weight of the base mix for the cementitious settable fluids. In further embodiments, the activator is present in the settable fluids in an amount ranging between any of and including any of 10%, 15%, 20%, 25%, 30%, 35%, or 40% by weight of the zeolite for settable spotting fluids or by weight of the base mix for cementitious settable fluids. The activator may be one or more of lime, lime hydrate, calcium hydroxide, calcium chloride, sodium silicate, sodium fluoride, sodium silicofluoride, magnesium silicofluoride, zinc silicofluoride, sodium carbonate, potassium carbonate, sodium hydroxide, potassium hydroxide, sodium sulfate, or hydrates thereof. In one embodiment, the activator is calcium hydroxide. Selection of the type and amount of activator depends on the type and make-up of the composition in which the activator is contained, and it is understood by those of ordinary skill in the art in light of the present disclosure how to select a suitable type and amount of activator.

Retarder: The term, "retarder," as used in this application means a composition having properties of slowing the setting time of a zeolite-fly ash/activator settable fluid and, thereby, controlling the setting time of such a composition. Controlling the set time is desirable for a settable spotting fluid, for example, to allow flexibility to adjust to wellbore conditions, or to adjust for adequate removal of drilling or spacer fluids. Suitable retarders include but are not limited to one or more of a lignosulfonate, an organic acid having an α-hydroxy group such as citric acid, tartaric acid or gluconic acid, salts thereof, and combinations thereof. Further examples of carboxylic acids that retard the setting time include carboxylic acids such as malic acid, lactic acid, combinations thereof, as well as alkaline earth metal salts thereof such as calcium, potassium, or barium salts, and the like. The salt of the organic acid may have a cation containing an element of the periodic chart listed in Group I or in Group II. Selection of the type and amount of retarder largely depends on the nature and composition of the set composition, and those of ordinary skill in the art in light of the present disclosure will understand how to select a suitable type and amount of retarder.

In general, the retarder is present in an amount of from about 1.0% by weight of zeolite to about 5.0% by weight of zeolite for settable spotting fluids and, in additional embodiments, the retarder is present in an amount ranging between any of and including any of 1.5%, 2.0%, 2.4%, 2.5%, 2.6%, 2.7%, 2.8%, 2.9%, 3.0%, 3.2%, 3.5% or 4.0% by weight of zeolite for settable spotting fluids. Those of ordinary skill in the art will understand in light of the present disclosure how to exert control over the amount of time that it takes the settable fluid to set by determining, through the exercise of routine experimentation, the amount of retarder necessary to achieve a set over a desired period of time. In general, settable fluids having an amount of an organic acid retarder greater than about 5.0% by weight of the zeolite have an impractically long setting time. In one embodiment, the retarder comprises a 2/1 lignosulfonate/tartaric acid solution, commercially available under the tradename HR-13L from Halliburton Energy Services, Duncan, Okla.

A retarder in addition to an accelerator may be used in settable fluids of the present invention useful as cementitious materials. The set time of a cementitious slurry may be adjusted to a desired set time by one of ordinary skill in the art in light of the present disclosure by adjusting the amount of an accelerator and the amount of a retarder.

Accelerators: Setting accelerators increase the rate of the setting reaction and are added to the mixes for cementitious settable fluids. Setting accelerators include compounds such as sodium chloride, sodium sulfate, sodium aluminate, sodium carbonate, calcium sulfate, calcium carbonate, aluminum sulfate, potassium sulfate, potassium carbonate and alums, or a combination thereof, for example. The accelerating additives are present in an amount of from about 0.5% to about 9.0% based on the weight of the base mix and, in additional embodiments, the accelerators are present in an amount ranging between any of and including any of 1.0%, 1.5%, 2.0%, 2.5%, 3.0%, 3.5%, 4.0%, 5.0%, 6.0%, 7.0% or 8.0% of the weight of the base mix. In particular embodiments, an accelerator is present in settable fluids where conditions of a setting temperature is less than about 140° F. (60.0° C.). In certain embodiments, sodium sulfate is the accelerator.

Carrier Fluids: Carrier fluids suitable for use in embodiments of the settable fluids of the present invention comprise aqueous fluids, oil-based and synthetic-based fluids, emulsions, acids, or mixtures thereof. Exemplary aqueous fluids include but are not limited to water and water-based gels. When the carrier fluid comprises water, the water can be fresh water, unsaturated salt solution, including brines and seawater, and saturated salt solution. The carrier fluid is present in an amount of from about 20% to about 200% by weight of zeolite for compositions for settable spotting fluids, and in an amount of from about 20% to about 200% by weight of the base mix for cementitious materials. In further embodiments, the carrier fluid is present in an amount of from about 100% to about 200%, from about 50% to about 150% or from about 100% to about 125% by weight of zeolite for settable spotting fluids, and by weight of base mix for cementitious materials. Exemplary oil-based fluids include but are not limited to canola oil, kerosene, diesel oil, fish oil, mineral oil, sunflower oil, corn oil, soy oil, olive oil, cottonseed oil, peanut oil and paraffin. Exemplary synthetic-based fluids include but are not limited to esters, olefins or ethers, e.g., esters having a $C_2$-$C_{12}$ alcohol portion and a $C_{16}$-$C_{24}$ carboxylic acid portion, olefins having a $C_6$-$C_{18}$ linear internal portion, or ethers having a $C_6$-$C_{24}$ portion. Those of ordinary skill in the art in light of the present disclosure will understand that the carrier fluid for the settable fluids as provided herein depends upon the properties desired for the compositions, as well as the cost, availability, temperature, stability, viscosity, clarity, and the like of the carrier fluid, and further that when non-aqueous carrier fluids are used, the settable fluid is expected to be exposed to an aqueous fluid in the well for the composition to set. For example, such aqueous fluids may come from the cementitious slurry or from the subterranean formation.

Setting Conditions: Setting of the settable spotting fluids and cementitious settable fluids of the present embodiments may occur under a variety of conditions including variations in time and temperature. In general, the rate of compressive strength development increases with temperature. Setting temperatures of about 32° F. to about 200° F. (0° C. to 93.3° C.) are appropriate for setting of the present compositions.

In further embodiments, a temperature ranging between any of and including any of 70° F. (21.1° C.), 90° F. (32.2° C.), 110° F. (43.3° C.), 130° F. (54.4° C.), 140° F. (60.0° C.), 150° F. (65.6° C.), 160° F. (71.1° C.), 170° F. (76.7° C.), 180° F. (82.2° C.), or 190° F. (87.8° C.) is appropriate for setting of the present compositions. A target setting time for a settable spotting fluid of the present invention is adjusted to between, for example, one to 14 days, by adjusting the amounts of the components described herein depending upon circumstances surrounding the drilling operations. A target setting time for a cementitious settable fluid of the present invention is adjusted such that the composition remains fluid for about 2 to about 6 hours to allow placing behind casing materials, and then sets within an acceptable time period such as a day. The settable fluids may comprise a slurry density of about 10 pounds per gallon (1200 kilograms per cubic meter) to about 15 pounds per gallon (1800 kilograms per cubic meter). In further embodiments, the settable fluids may comprise a slurry density ranging between any of and including any of about 11 ppg (1320 $Kg/m^3$), 11.5 ppg (1380 $Kg/m^3$), 12.0 ppg (1440 $Kg/m^3$) 12.5 ppg (1500 $Kg/m^3$), 13.0 ppg (1560 $Kg/m^3$), 13.2 ppg (1584 $Kg/m^3$), 13.4 ppg (1608 $Kg/m^3$), 13.6 ppg (1632 $Kg/m^3$), 13.8 ppg (1656 $Kg/m^3$), 14.0 ppg (1680 $Kg/m^3$), or 14.5 ppg (1740 $Kg/m^3$).

In a further embodiment of the present invention, the blended cement-free zeolite and Class F fly ash settable spotting fluid comprises chabazite and clinoptilolite, Class F fly ash in an amount of from about 100% to about 600% by weight of zeolite, lime in an amount of from about 5% to about 25% by weight of zeolite, a lignosulfonate/tartaric acid solution in an amount of from about 2% to about 4% by weight of zeolite, and a water-based carrier fluid in an amount of from about 100% to about 150% by weight of zeolite. In this embodiment, the source of calcium ion is lime.

In another embodiment of the present invention, the cement-free zeolite and Class F fly ash settable spotting fluid composition comprises a zeolite, Class F fly ash, a source of calcium ion, and a carrier fluid.

A blended cement-free cementitious zeolite and Class F fly ash settable fluid is a further embodiment of the present invention. The composition of this further embodiment comprises a base mix of zeolite and Class F fly ash, the zeolite comprising chabazite and clinoptilolite, lime in an amount of from about 5% to about 25% by weight of zeolite, sodium sulfate in an amount of from about 2.0% to about 4.0% by weight of the base mix, and a water-based carrier fluid in an amount of from about 100% to about 150% by weight of the base mix. In this embodiment, the source of calcium ion is lime.

An embodiment of the present invention is a method of preparing a cement-free zeolite and Class F fly ash settable spotting fluid, the method comprising blending a zeolite, Class F fly ash, a source of calcium ion, and a carrier fluid to form a blended composition; and allowing the blended composition to set. In embodiments of the invention, the settable spotting fluid comprises a retarder and, in further embodiments, the settable spotting fluid comprises an activator. In certain embodiments, the retarder comprises a lignosulfonate, an organic acid having an α-hydroxy group, a salt of an organic acid having an α-hydroxy group, or a combination thereof. In certain embodiments, the source of calcium ion may be the activator. The set composition has a compressive strength comparable to that of a settable spotting fluid in which zeolite is the only settable material.

In another embodiment of the present invention, the method of preparing a cement-free settable spotting fluid comprises of blending a mixture comprising zeolite, Class F fly ash, a source of calcium ion, and a water-based carrier fluid to form a blended composition.

A further embodiment of the present invention is a method of removing drilling fluid or spacer fluid from a wellbore, the method comprising introducing a cement-free settable spotting fluid into the wellbore, the fluid comprising a zeolite, Class F fly ash, a source of calcium ion, and a carrier fluid; and introducing a subsequent composition into the wellbore to displace all but a remaining portion of the settable spotting fluid from the wellbore. In embodiments of the invention, the settable spotting fluid comprises a retarder and, in further embodiments, the settable spotting fluid comprises an activator. In certain embodiments, the retarder comprises a lignosulfonate, an organic acid having an α-hydroxy group, a salt of an organic acid having an α-hydroxy group, or a combination thereof. In certain embodiments, the source of calcium ion may be the activator. The cement-free settable spotting fluid has a compressive strength comparable to that of a settable spotting fluid in which zeolite is the only settable material.

In another embodiment of the present invention, the method of removing drilling fluid or spacer fluid from a wellbore comprises introducing a cement-free settable spotting fluid into the wellbore, the fluid comprising a zeolite, Class F fly ash, a source of calcium ion, and a water-based carrier fluid; and introducing a subsequent composition into the wellbore to displace all but a remaining portion of the settable spotting fluid from the wellbore.

Another embodiment of the present invention is a method of removing drilling fluid or spacer fluid from a wellbore, the method comprising introducing a cement-free settable spotting fluid into the wellbore, the fluid comprising a zeolite, Class F fly ash, a source of calcium ion, a retarder, and a carrier fluid; and introducing a subsequent composition into the wellbore, the subsequent composition comprising an activator to displace all but a remaining portion of the settable spotting fluid from the wellbore and to form a set composition. In certain embodiments, the retarder comprises a lignosulfonate, an organic acid having an α-hydroxy group, a salt of an organic acid having an α-hydroxy group, or a combination thereof. In certain embodiments, the source of calcium ion may be the activator.

In another embodiment of the present invention, the method of removing drilling fluid or spacer fluid from a wellbore comprises introducing a cement-free settable spotting fluid into the wellbore, the fluid comprising a zeolite, Class F fly ash, a source of calcium ion, and a water-based carrier fluid.

The above methods of using a settable spotting fluid may further comprise allowing the remaining portion of the settable spotting fluid to set. As stated above, when the settable spotting fluid has set, it has a compressive strength comparable to that of a settable spotting fluid in which zeolite is the only settable material. The remaining portion of the settable spotting fluid may be in one or more of a filter cake, fissure, fracture, cavern, vug, thief zone, low pressure subterranean zone, and high pressure subterranean zone in the wellbore. Further, the remaining portion of the settable spotting fluid as a set may seal one or more of a fissure, fracture, cavern, vug, thief zone, low pressure subterranean zone, and high pressure subterranean zone in the wellbore. Even further, introducing of the settable spotting fluid may at least partially displace mud from the wellbore.

In practicing methods according to the present embodiments, drilling fluid (also referred to herein as "mud") remaining in a wellbore during a shutdown period is at least partially displaced with a settable spotting fluid of the present invention. Preferably, the mud in the wellbore is displaced by the settable spotting fluid before the mud has had a chance to gain significant gel strength. By displacing the mud before it gains significant gel strength, difficulties with removing portions of it during clean-up operations in the wellbore are reduced. As used herein, the term "mud" encompasses any fluid used in hydrocarbon drilling operations, including but not limited to all types of water-base, oil-base and synthetic-base drilling fluids, and fluids that contain significant amounts of suspended solids, emulsified water or oil.

According to one embodiment where a settable spotting fluid at least partially displaces mud from the wellbore, the settable spotting fluid is subsequently flushed out of the wellbore by washes or spacer fluids circulated through the wellbore. A cementitious slurry may then be pumped into the annulus and allowed to set, thus bonding the pipe to the walls of the wellbore. The setting of the cementitious material, and consequently the bonding of the pipe to the walls of the wellbore, is improved because difficulties with removing portions of the mud from the wellbore are reduced.

According to another embodiment where a settable spotting fluid at least partially displaces mud from a wellbore, portions of the settable spotting fluid remain on the walls of the wellbore as part of the filter cake, and/or in permeable areas affecting the wellbore, such as fissures, fractures, caverns, vugs, thief zones, low pressure subterranean zones or high pressure subterranean zones, even if washes or spacer fluids are introduced into the wellbore subsequent to the settable spotting fluid. According to such an embodiment, a subsequent composition, for example, a drilling fluid, pill, spotting fluid, cement or other mud is pumped into the wellbore. The subsequent composition is pumped into the wellbore, either after the settable spotting fluid, or after the washes or spacer fluids, if such are used. When an activator in the subsequent composition contacts the settable spotting fluid remaining in the filter cake and/or permeable areas, the activator causes the fluid therein to set.

While certain embodiments described herein relate to settable spotting fluids, it is understood that any wellbore treating fluids such as drilling, completion and stimulation fluids including, but not limited to, drilling muds, remedial compositions, well cleanup fluids, workover fluids, spacer fluids, gravel pack fluids, acidizing fluids, fracturing fluids, conformance fluids and the like can be prepared using the compositions herein. Accordingly, methods of the present invention comprise preparing a wellbore treating fluid using a settable fluid of the present invention, as described herein, and placing the fluid in a subterranean formation. Other methods according to the present embodiments include performing drilling operations, completing and/or stimulating a subterranean formation, and performing primary cementing operations using a wellbore treating fluid comprising a composition of the present invention.

An embodiment of the present invention is a method of preparing a cement-free zeolite and Class F fly ash cementitious settable fluid, the method comprising blending a base mix of zeolite and Class F fly ash, a source of calcium ion, and a carrier fluid to form a blended cementitious settable fluid. In embodiments of the invention, the cementitious settable fluid comprises an activator and, in further embodiments, the cementitious settable fluid comprises an accelerator. The source of calcium ion may be the activator. The method may further comprise foaming the cementitious composition to form a foamed cementitious composition. Further, the blended composition may be allowed to set.

Another embodiment of the present invention is a method of sealing a subterranean zone penetrated by a wellbore and casing with a cement-free cementitious settable fluid. The method comprises mixing a blend comprising a base mix of zeolite and Class F fly ash, a source of calcium ion, and a carrier fluid to form a cementitious settable fluid, placing the cementitious settable fluid into the subterranean zone; and allowing the cementitious fluid to set therein. In embodiments of the invention, the cementitious fluid comprises an activator and, in further embodiments, the cementitious fluid comprises an accelerator. The source of calcium ion may be the activator.

A further embodiment of the present invention is a method of decreasing a set time of a Class F fly ash, lime, and accelerator settable fluid, the method comprising adding zeolite to a slurry of the Class F fly ash, lime and accelerator settable fluid to form a cementitious settable fluid having a decreased set time compared to the Class F fly ash, lime, and accelerator composition. In an embodiment, the amount of zeolite is present in an amount of greater than 0% to about 30% by weight of a base mix of zeolite and Class F fly ash.

Cement-free cementitious settable fluid embodiments of the present invention may further comprise additives known to those of ordinary skill in the art, including but not limited to silica, lightweight additives, retarders, fluid loss control additives, flow enhancing agents, and dispersants, for example. Any such cementitious settable fluids may be placed into a subterranean zone and allowed to set therein, thereby sealing the subterranean zone.

The following examples are illustrative of the methods and compositions discussed above. Slurries in the following examples were prepared, and compressive strengths were measured, according to API recommended practice for testing well cements as described in API Recommended Practice 10B, 22nd edition, December 1997. Static gel strength was measured according to API Recommended Practice Standard Procedure for Field Testing Drilling Fluids 13B, Appendix B, Shear Strength Measurement using Shearometer Tube. The test was performed using a FANN® Model 240 Shearometer, available from Fann Instrument Company, Houston, Tex., and operated according to the FANN® Model 240 Shearometer Instruction Card.

EXAMPLE 1

Zeolite and Class F Fly Ash Settable Fluid as a Cement-Free Settable Spotting Fluid Class F fly ash (Pozmix®, Halliburton Energy Services, Duncan, Okla.) and zeolite were combined to provide a cement-free settable spotting fluid that is less costly than a zeolite-only based system, yet has viable strength development. Table 1 provides the composition of a slurry having a density of 12.8 ppg (1536 Kg/m$^3$). Zeolite, fly ash, and the hydrated lime (calcium hydroxide) were dry-mixed by hand in a glass jar. This dry mix was added over a 15 second period to a carrier fluid being maintained in a Waring blender at 4,000 RPM. The blender speed was then increased to 12,000 RPM and mixing was continued for 35 seconds. The density of the slurry could be adjusted from 12-15 ppg (1440 Kg/m$^3$-1800 Kg/m$^3$) using either lightweight or heavyweight additives known to one of ordinary skill in the art in light of the present disclosure. The amount of retarder (in this example, HR-13L, a 2/1 lignosulfonate/tartaric acid solution, Halliburton Energy Services, Duncan, Okla.) could also be adjusted depending upon the desired setting temperature and desired setting delay.

TABLE 1

Zeolite/Fly Ash Slurry of Density 12.8 ppg (1536 Kg/m$^3$)

| Component | Amount by Weight of Zeolite (bwz) |
|---|---|
| Water | 122.8% |
| Zeolite | 100% |
| Class F fly ash (Pozmix® A) | 100% |
| Hydrated Lime | 15% |
| Retarder (HR-13L) | 3.2% |

Table 2 below provides data for static gel strength development of the above slurry (12.8 ppg (1536 Kg/m$^3$)) with respect to the waiting time at 160° F. or 190° F. (71.1° C.-87.8° C.) under atmospheric pressure. The gel strength is reported in Table 2 in pounds per 100 square feet of area ("lb/100 ft$^2$") and in pascals (Pa). The data show that the slurries do not develop significant gel strength under these conditions for 3 days depending upon setting temperature.

TABLE 2

Static Gel Strength as a Function of Time and Temperature for Table 1 Composition

| | Gel Strength | | | Compressive Strength |
|---|---|---|---|---|
| Temp | 1 day | 2 days | 3 days | 7 days |
| 160° F. (71° C.) | <10 lb/100 ft$^2$ (4.8 Pa) | <10 lb/100 ft$^2$ (4.8 Pa) | ~30 lb/100 ft$^2$ (14.4 Pa) | 400 psi (2.75 MPa) |
| 190° F. (88° C.) | <10 lb/100 ft$^2$ (4.8 Pa) | <10 lb/100 ft$^2$ (4.8 Pa) | ~50 lb/100 ft$^2$ (23.9 Pa) | 450 psi (3.10 MPa) |

Compressive strength of the set mass at Day 7 is reported in Table 2 in pounds per square inch ("psi") and in megapascals (MPa). To determine the compressive strength, the composition of Tables 1 and 2 (7 days) was placed in sealed cylindrical plastic containers, 2 inches (5 cm) in diameter by 4 inches (10 cm) in height. Each plastic container was placed in a water bath at the temperature reported in Table 2, under 3000 psi (20.7 Mpa), for the time periods reported in Table 2. Each plastic container was then removed from the water bath, allowed to cool, and the cylindrical samples were demolded. The top end of each cylindrical sample was cut using a tile saw to give a smooth and level surface. The remainder of the sample was then placed in a Tinius Olsen universal testing machine and the compressive strength determined according to operating procedures for the universal testing machine.

As a control for the data of Table 2, the gel strength development of a purely fly ash-based system (i.e., the composition of Table 1 without zeolite) is shown below in Table 3.

TABLE 3

Static Gel Strength as a Function of Time and Temperature for Table 1 Composition Lacking Zeolite

| | Gel Strength | | |
|---|---|---|---|
| Temp | 1 day | 7 days | 15 days |
| 160° F. (71° C.) | <10 lb/100 ft$^2$ (4.8 Pa) | <10 lb/100 ft$^2$ (4.8 Pa) | ~25 lb/100 ft$^2$ (12 Pa) |
| 190° F. (88° C.) | <10 lb/100 ft$^2$ (4.8 Pa) | <10 lb/100 ft$^2$ (4.8 Pa) | ~40 lb/100 ft$^2$ (19.2 Pa) |

Comparison of the data of Table 2 with the data of Table 3 shows that, in the absence of zeolite, the slurry does not develop significant gel strength under the same conditions for at least 15 days.

Figure 1:
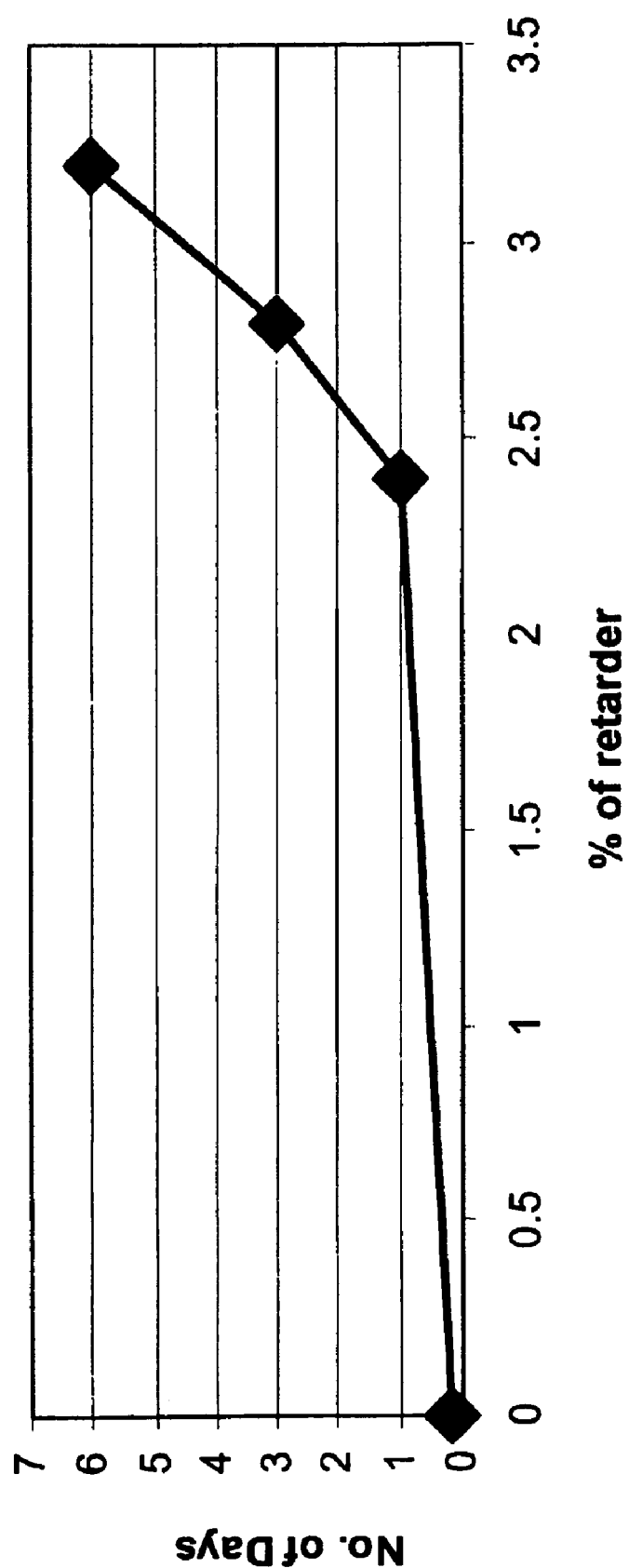
FIG. 1 shows the time in days to reach 50 psi (0.34 MPa) @160° F. (71.1° C.) in an ultrasonic cement analyzer as a function of retarder concentration.

FIG. 1 shows the trend of early strength development (time to reach 50 psi @ 160° F. in UCA (0.34 MPa @ 71.1° C.)) as a function of retarder concentration. The delay in strength development (in other words, delay in the occurrence of the pozzolan-lime reaction) was minor for retarder concentrations up to 2.4%. However, the delay became prominent at higher concentrations of retarder. Organic acid present in the retarder is believed to gradually react with the sparingly soluble Ca(OH)$_2$ in the slurry thereby delaying the pozzolan-lime reaction that is limited by diffusion in such a condensed phase. Once the acid molecules are consumed to produce the calcium salt, strength development i.e., the pozzolan-lime reaction begins. The initial low response of the retarder at concentrations up to 2.4% is believed due to the immediate neutralization of the acid molecules upon reaction with the already dissolved Ca(OH)$_2$ in the slurry.

The ability to delay setting, yet obtain sufficient compressive strength, is desirable in a settable spotting fluid. Cement-free settable spotting fluids of the present invention provide such delay, desired compressive strength, and lowered cost as compared to compositions in which zeolite is the only settable material.

EXAMPLE 2

Zeolite and Class F Fly Ash Settable Fluid as a Cement-Free Cementitious Settable Fluid The present example provides cement-free zeolite and fly ash settable fluids that include an accelerator in addition to an activator. The presence of an accelerator allows for high slurry densities without the presence of a dispersant or retarder. The compositions are capable of setting at a set temperature less than or equal to 100° F. (37.8° C.). Table 4 provides data on slurries having 12 ppg (1440 Kg/m$^3$) and 13.8 ppg (1656Kg/m$^3$) cured at 80° F. (26.7° C.), at atmospheric pressure and for 72 hours. Compressive strength was measured using the Tinius Olsen method as for Example 1.

TABLE 4

Compositions of Different Densities Set at 80° F. (26.7° C.) and Compressive Strengths Thereof

| Slurry No. | Density (ppg) (Kg/m³) | Lime %[2] | Zeo %[1] | Pozmix® -A %[1] | CFR-6 %[2,3] | Na₂SO₄ %[2] | Water (gal/sk) | CS[4] (psi) (Mpa) |
|---|---|---|---|---|---|---|---|---|
| 1 | 13.8 (1656) | 15 | 40 | 60 | 2 | 2 | 6.23 | 802 (5.52) |
| 2 | 13.8 (1656) | 15 | 30 | 70 | 1 | 2 | 6.27 | 703 (4.85) |
| 3 | 13.8 (1656) | 15 | 15 | 85 | 0 | 2 | 6.33 | 495 (3.41) |
| 4 | 13.8 (1656) | 15 | 0 | 100 | 0 | 2 | 6.39 | 303 (2.09) |
| 5 | 12 (1440) | 15 | 50 | 50 | 0 | 2 | 11.87 | 204 (1.41) |
| 6 | 12 (1440) | 15 | 70 | 30 | 0 | 2 | 11.77 | 288 (1.99) |
| 7 | 12 (1440) | 15 | 100 | 0 | 0 | 2 | 11.62 | 354 (2.44) |

[1] The amount of zeolite and Class F fly ash (Pozmix ®-A) together make up a base mix by weight.
[2] The amount is a percentage by weight of the base mix.
[3] CFR-6 is available from Halliburton Energy Services, Duncan, Oklahoma.
[4] CS is compressive strength.

Figure 2:
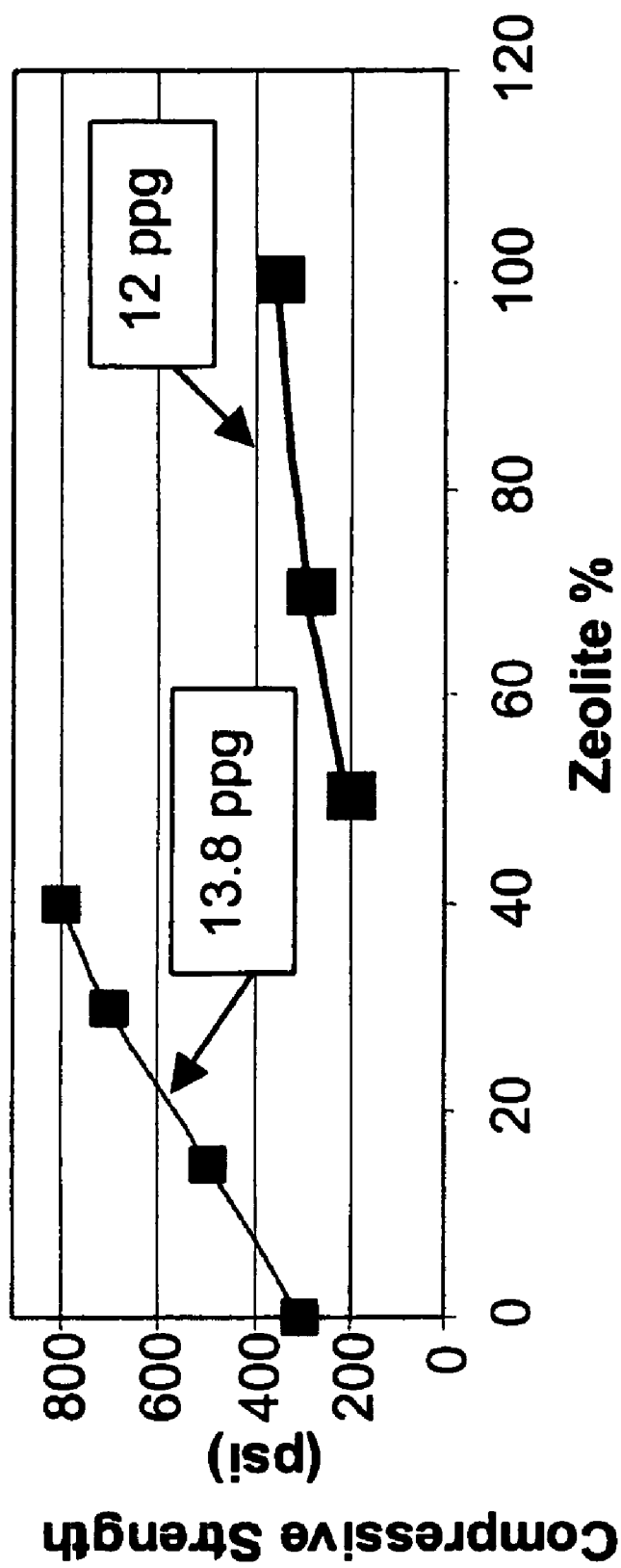
FIG. 2 shows compressive strength data in psi obtained by the Tinius Olsen method for slurries 1-7 of Table 4 of Example 2 plotted as a function of zeolite concentration. The slurries were cured in a water bath at 80° F. (26.7° C.) for 72 hours. Slurries having up to and including 40% zeolite had a slurry density of 13.8 ppg (1656 Kg/m$^3$) and slurries having 50% or greater zeolite had a slurry density of 12 ppg (1440 Kg/m$^3$).

Table 4 and FIG. 2 show the compressive strength data obtained by the Tinius Olsen method for slurries 1-7 cured in a water bath at 80° F. (26.7° C.). For a given density, a decrease in the compressive strength is observed as the amount of fly-ash is increased and the amount of zeolite correspondingly decreased. At 85% of fly-ash in the slurry and 15% zeolite, no dispersant (i.e., no CFR-6) is needed to prepare a mixable slurry having a high density of 13.8 ppg (1656 Kg/m³). Further, lower amounts of zeolite in the composition contribute to a lower cost of the composition. The inventors also observed that for a slurry density of 12 ppg (1440 Kg/m³) decreasing the zeolite content below 50% led to over-thinning of the slurry, and that slurries having a density of 13.8 ppg (1656 Kg/m³) were difficult to mix above 40% zeolite. Such results may be compensated for by adding either light or heavy weight additives known to one of skill in the art in light of the present disclosure. In general, an increase in slurry density (from 12 to 13.8 ppg (1440 to 1656 Kg/m³)) increases the compressive strength when the slurry composition does not change except for the water content. In general, the presence of more water yields less strength.

Figure 3:
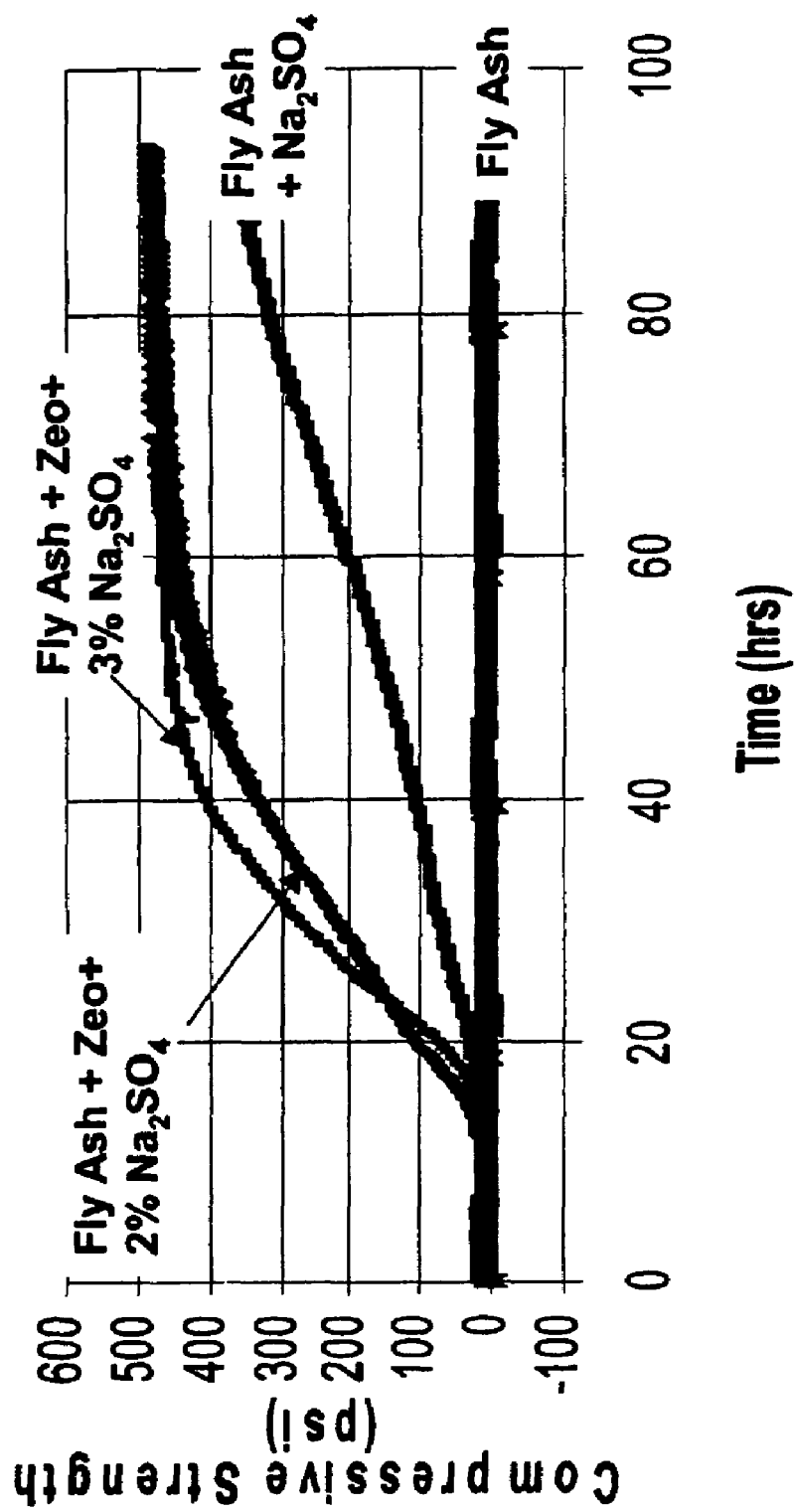
FIG. 3 provides data on UCA compressive strength development versus time in hours for four 13.8 ppg (1656 Kg/m$^3$) slurries at 80° F. (26.7° C.). The data are designated as follows.

FIG. 3 provides data on UCA compressive strength development versus time in hours for four 13.8 ppg (1656 Kg/m³) slurries at 80° F. (26.7° C.) as follows:
Fly Ash: Pozmix® A+lime at 15%, no Na₂SO₄, no zeolite, 
Fly Ash+Na₂SO₄: Pozmix® A+lime at 15%, 2% Na₂SO₄, no zeolite (Slurry 4 of Table 4)
Fly Ash+Zeo+2% Na₂SO₄: Pozmix® A+lime at 15%, 2% Na₂SO₄, 15% zeolite (Slurry 3 of Table 4)
Fly Ash+Zeo+3% Na₂SO₄: Pozmix® A+lime at 15%, 3% Na₂SO₄, 15% zeolite The slurry with 100% Class F fly ash and 15% lime-hydrate and having a density of 13.8 ppg (1656 Kg/m³) did not develop significant compressive strength for at least 7 days at the temperature of 80° F. (26.7° C.). However, it is known that such a composition would develop compressive strength at a temperature of 140° F. (60.0° C.). Addition of 2% Na₂SO₄ accelerates the reaction such that by 80 hours, the compressive strength is about 300 psi (2.07 MPa). Further addition of zeolite allows development of compressive strength more quickly and at a higher level, i.e., a strength of 300 psi (2.07 MPa) is achieved at about 30 to 35 hours depending upon the amount of sodium sulfate present.

FIG. 4 shows UCA compressive strength development at 100° F. (37.8° C.) for Slurry 3 of Table 4 versus time in hours. The data of FIG. 4, when compared to the data of Slurry 3 of FIG. 3, demonstrate that an increase in curing temperature of twenty degrees to 100° F. (37.8° C.) accelerates strength development and increases the final compressive strength of the composition.

Other embodiments of the present invention will be apparent to those skilled in the art from a consideration of this specification or practice of the embodiments disclosed herein. However, the foregoing specification is considered merely exemplary of the present invention with the true scope and spirit of the invention being indicated by the following claims.

The references cited herein, to the extent that they provide exemplary procedural or other details supplementary to those set forth herein, are specifically incorporated by reference.

As used herein and unless otherwise indicated, the terms "a" and "an" are taken to mean "one", "at least one" or "one or more".

What is claimed is:

1. A method of treating a subterranean zone, comprising:
   introducing a cement-free settable fluid into the zone, the fluid comprising:
   a zeolite represented by the formula:

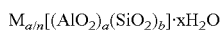

$M_{a/n}[(AlO_2)_a(SiO_2)_b] \cdot xH_2O$ where
   M represents one or more cations selected from the group consisting of Na, K, Mg, Ca, Sr, Li, Ba, NH₄, CH₃NH₃, (CH₃)₃NH, (CH₃)₄N, Ga, Ge and P;

n represents the cation valence;
b:a ratio is in a range from greater than or equal to 1 and less than or equal to 5; and
x represents number of moles of water entrained into the zeolite
Class F fly ash,
a source of calcium ion,
an accelerator that comprises sodium sulfate, sodium carbonate, calcium sulfate, calcium carbonate, potassium sulfate, or potassium carbonate, and
a carrier fluid; and
allowing the fluid to set at a temperature of less than about 140° F. therein.

2. The method of claim 1 wherein the cement-free settable fluid further comprises a retarder.

3. The method of claim 2 wherein the cement-free settable fluid further comprises an activator.

4. The method of claim 3 further comprising: introducing a subsequent composition into the zone to displace all but a remaining portion of the cement-free settable fluid from the zone prior to allowing the fluid to set therein.

5. The method of claim 4 wherein the remaining portion of the cement-free settable fluid is in one or more of a filter cake, fissure, fracture, cavern, vug, thief zone, low pressure subterranean zone, and high pressure subterranean zone.

6. The method of claim 3 wherein the introduction of the cement-free settable fluid at least partially displaces mud from the zone.

7. The method of claim 3 wherein the activator comprises calcium hydroxide, sodium silicate, sodium fluoride, sodium silicofluoride, magnesium silicofluoride, zinc silicofluoride, sodium carbonate, potassium carbonate, sodium hydroxide, potassium hydroxide, sodium sulfate, or mixtures thereof.

8. The method of claim 3 wherein the source of calcium ion is a carbonate, carboxylate, silicate, nitrate, nitrite, phosphate, sulfate, sulfite, or halide salt of calcium, or an oxide or hydroxide of calcium.

9. The method of claim 3 wherein the source of calcium ion is the activator.

10. The method of claim 3 wherein the zeolite comprises analcime, bikitaite, brewsterite, chabazite, clinoptilolite, faujasite, harmotome, heulandite, laumontite, mesolite, natrolite, paulingite, phillipsite, scolecite, stellerite, stilbite, or thomsonite.

11. The method of claim 3 wherein the carrier fluid comprises a water-based carrier fluid in an amount of from about 20 to about 200 percent by weight of the zeolite.

12. The method of claim 3 wherein the carrier fluid comprises fresh water, unsaturated salt solution, brine, seawater, or saturated salt solution.

13. The method of claim 3 wherein the retarder comprises a lignosulfonate, an organic acid having an α-hydroxy group, a salt of an organic acid having an α-hydroxy group, or a combination thereof.

14. The method of claim 3 wherein the subterranean zone is treated by removing drilling fluid or spacer fluid from a wellbore within the subterranean zone.

15. The method of claim 3 wherein the subterranean zone is treated by preparing a wellbore for cementing, and the method further comprises:
displacing a fluid with the cement-free settable fluid,
running a casing into the wellbore,
placing a cement composition behind the casing, and
allowing the cement composition to set.

16. The method of claim 4 wherein an activator is present in the subsequent composition.

17. The method of claim 16 wherein the activator comprises calcium hydroxide, sodium silicate, sodium fluoride, sodium silicofluoride, magnesium silicofluoride, zinc silicofluoride, sodium carbonate, potassium carbonate, sodium hydroxide, potassium hydroxide, sodium sulfate, or mixtures thereof.

18. The method of claim 1 wherein the settable fluid further comprises an activator.

19. The method of claim 18 wherein the activator comprises calcium hydroxide, sodium silicate, sodium fluoride, sodium silicofluoride, magnesium silicofluoride, calcium chloride, zinc silicofluoride, sodium carbonate, potassium carbonate, sodium hydroxide, potassium hydroxide, sodium sulfate, or mixtures thereof.

20. The method of claim 18 wherein the zeolite comprises analcime, bikitaite, brewsterite, chabazite, clinoptilolite, faujasite, harmotome, heulandite, laumontite, mesolite, natrolite, paulingite, phillipsite, scolecite, stellerite, stilbite, or thomsonite.

21. The method of claim 18 wherein the zeolite and Class F fly ash form a base mix and the carrier fluid comprises a water-based carrier fluid in an amount of from about 100 to about 200 percent by weight of the base mix.

22. The method of claim 1 wherein the accelerator comprises sodium sulfate.

23. The method of claim 18 wherein the source of calcium ion is the activator.

24. The method of claim 18 wherein the source of calcium ion is a carbonate, carboxylate, silicate, nitrate, nitrite, phosphate, sulfate, sulfite, or halide salt of calcium, or an oxide or hydroxide of calcium.

25. The method of claim 1 wherein the fluid is allowed to set at a temperature of 80° F. to 100° F.

26. The method of claim 18 wherein the composition has a density of equal to or greater than 12 ppg.

27. The method of claim 18 wherein the subterranean zone is treated by sealing the subterranean zone penetrated by a wellbore.

28. The method of claim 1 wherein the cement-free settable fluid is a drilling fluid, spacer fluid, settable spotting fluid, cementitious fluid, completion fluid, stimulation fluid, remedial fluid, well cleanup fluid, workover fluid, gravel pack fluid, acidizing fluid, fracturing fluid, conformance fluid, or a combination thereof.

29. A method of preparing a cement-free settable fluid, comprising:
combining
a zeolite represented by the formula:

$$M_{a/n}[(AlO_2)_a(SiO_2)_b] \cdot xH_2O$$

where
M represents one or more cations selected from the group consisting of Na, K, Mg, Ca, Sr, Li, Ba, $NH_4$, $CH_3NH_3$, $(CH_3)_3NH$, $(CH_3)4N$, Ga, Ge and P;
n represents the cation valence;
b:a ratio is in a range from greater than or equal to 1 and less than or equal to 5; and
x represents number of moles of water entrained into the zeolite,
Class F fly ash,
a source of calcium ion,
an accelerator that comprises sodium sulfate, sodium carbonate, calcium sulfate, calcium carbonate, potassium sulfate, or potassium carbonate, and
a carrier fluid,
wherein the setting fluid is allowed to set at a temperature of less than about 140° F.

30. The method of claim 29 wherein the cement-free settable fluid further comprises a retarder.

31. The method of claim 30 wherein the cement-free settable fluid further comprises an activator.

32. The method of claim 31 wherein the zeolite comprises analcime, bikitaite, brewsterite, chabazite, clinoptilolite, faujasite, harmotome, heulandite, laumontite, mesolite, natrolite, paulingite, phillipsite, scolecite, stellerite, stilbite, or thomsonite.

33. The method of claim 31 wherein the activator comprises calcium hydroxide, sodium silicate, sodium fluoride, sodium silicofluoride, magnesium silicofluoride, zinc silicofluoride, sodium carbonate, potassium carbonate, sodium hydroxide, potassium hydroxide, sodium sulfate, or mixtures thereof.

34. The method of claim 31 wherein the carrier fluid comprises a water-based carrier fluid in an amount of from about 100 to about 200 percent by weight of the zeolite.

35. The method of claim 31 wherein the retarder comprises a lignosulfonate/tartaric acid solution, an organic acid having an Q-hydroxy group, a salt of an organic acid having an α-hydroxy group, or a combination thereof.

36. The method of claim 31 wherein the source of calcium ion is the activator.

37. The method of claim 31 wherein the source of calcium ion is a carbonate, carboxylate, silicate, nitrate, nitrite, phosphate, sulfate, sulfite, or halide salt of calcium, or an oxide or hydroxide of calcium.

38. The method of claim 29 further comprising combining an activator in the settable fluid.

39. The method of claim 38 wherein the activator comprises calcium hydroxide, sodium silicate, sodium fluoride, sodium silicofluoride, magnesium silicofluoride, zinc silicofluoride, sodium carbonate, potassium carbonate, sodium hydroxide, potassium hydroxide, sodium sulfate, or mixtures thereof.

40. The method of claim 38 further comprising allowing the settable fluid to set.

41. The method of claim 38 wherein the zeolite comprises analcime, bikitaite, brewsterite, chabazite, clinoptilolite, faujasite, harmotome, heulandite, laumontite, mesolite, natrolite, paulingite, phillipsite, scolecite, stellerite, stilbite, or thomsonite.

42. The method of claim 38 wherein the settable fluid further comprises an accelerator.

43. The method of claim 29 wherein the accelerator comprises sodium sulfate.

44. The method of claim 38 further comprising foaming the composition to form a foamed composition.

45. The method of claim 38 wherein the carrier fluid comprises a water-based carrier fluid.

46. The method of claim 38 wherein the source of calcium ion is the activator.

47. The method of claim 38 wherein the source of calcium ion is a carbonate, carboxylate, silicate, nitrate, nitrite, phosphate, sulfate, sulfite, or halide salt of calcium, or an oxide or hydroxide of calcium.

48. The method of claim 29 wherein the cement-free settable fluid is a drilling fluid, spacer fluid, settable spotting fluid, cementitious fluid, completion fluid, stimulation fluid, remedial fluid, well cleanup fluid, workover fluid, gravel pack fluid, acidizing fluid, fracturing fluid, conformance fluid, or a combination thereof.

49. A cement-free settable fluid comprising:
a zeolite represented by the formula:

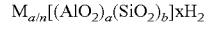

where
M represents one or more cations selected from the group consisting of Na, K, Mg, Ca, Sr, Li, Ba, $NH_4$, $CH_3NH_3$, $(CH_3)_3NH$, $(CH_3)_4N$, Ga, Ge and P;
n represents the cation valence;
b:a ratio is in a range from greater than or equal to 1 and less than or equal to 5; and
x represents number of moles of water entrained into the zeolite,
Class F fly ash,
a source of calcium ion, and
an oil-based carrier fluid.

50. The cement-free settable fluid of claim 49 further comprising a retarder.

51. The cement-free settable fluid of claim 50 further comprising an activator.

52. The cement-free settable fluid of claim 51 wherein the carrier fluid is in an amount of from about 50% to about 150% by weight of the zeolite.

53. The cement-free settable fluid of claim 51 wherein the carrier fluid is in an amount of from about 100% to about 125% by weight of the zeolite.

54. The cement-free settable fluid of claim 49 further comprising an activator.

55. The cement-free settable fluid of claim 54 wherein the zeolite and Class F fly ash form a base mix and the oil-based carrier fluid is in an amount of from about 50% to about 150% by weight of the base mix.

56. The cement-free settable fluid of claim 54 wherein the zeolite and Class F fly ash form a base mix and the oil-based carrier fluid is in an amount of from about 100% to about 125% by weight of the base mix.

57. A cement-free settable fluid comprising:
a zeolite selected from the group consisting of analcime, bikitaite, brewsterite, chabazite, clinoptilolite, faujasite, harmotome, heulandite, laumontite, mesolite, natrolite, paulingite, phillipsite, scolecite, stellerite, stilbite, and thomsonite;
Class F fly ash;
a source of calcium ion; and an oil-based carrier fluid.

* * * * *